(12) United States Patent
Minamiguchi et al.

(10) Patent No.: US 11,639,853 B2
(45) Date of Patent: May 2, 2023

(54) SELF-LOCALIZATION ESTIMATION DEVICE

(71) Applicant: DENSO CORPORATION, Kariya (JP)

(72) Inventors: Yuichi Minamiguchi, Kariya (JP); Kenji Miyake, Kariya (JP); Tatsumi Sugiyama, Kariya (JP); Kazuyoshi Isaji, Kariya (JP); Minoru Okada, Kariya (JP); Kenta Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 649 days.

(21) Appl. No.: 16/568,606

(22) Filed: Sep. 12, 2019

(65) Prior Publication Data

US 2020/0003567 A1 Jan. 2, 2020

Related U.S. Application Data

(63) Continuation of application No. PCT/JP2018/010068, filed on Mar. 14, 2018.

(30) Foreign Application Priority Data

Mar. 16, 2017 (JP) .............................. JP2017-051066
Dec. 26, 2017 (JP) .............................. JP2017-248744
Dec. 26, 2017 (JP) .............................. JP2017-248745

(51) Int. Cl.
*G01C 21/34* (2006.01)
*G06T 7/73* (2017.01)
(Continued)

(52) U.S. Cl.
CPC ... *G01C 21/3407* (2013.01); *B60W 30/18163* (2013.01); *G01C 21/30* (2013.01);
(Continued)

(58) Field of Classification Search
CPC ................ G01C 21/3407; G01C 21/30; G01C 21/3446; B60W 30/18163;
(Continued)

(56) References Cited

U.S. PATENT DOCUMENTS 9,483,700 B1 * 11/2016 Chen .................... G06V 20/588
2010/0324815 A1 12/2010 Hiruta et al.
(Continued)

FOREIGN PATENT DOCUMENTS

JP 2008-249639 A 10/2008
JP 2010-078387 A 4/2010
(Continued)

*Primary Examiner* — Krishnan Ramesh
(74) *Attorney, Agent, or Firm* — Maschoff Brennan

(57) ABSTRACT

A self-localization estimation unit of a self-localization estimation device determines, based on mutual relationships between the in-lane position and the absolute position including the error, whether there is lane-relevant candidate information, the lane-relevant candidate information representing that one or more in-vehicle positions are each estimated to be in which of lanes identified by the lane information; and estimates, based on a result of the determination of whether there is lane-relevant candidate information, a localization of the own vehicle corresponding to the map information.

7 Claims, 14 Drawing Sheets

(51) Int. Cl.
  *G06T 7/70* (2017.01)
  *B60W 30/18* (2012.01)
  *G01C 21/30* (2006.01)
  *G06V 10/75* (2022.01)
  *G06V 20/56* (2022.01)
  *G01S 19/48* (2010.01)

(52) U.S. Cl.
  CPC .......... *G01C 21/3446* (2013.01); *G01S 19/48* (2013.01); *G06T 7/70* (2017.01); *G06T 7/74* (2017.01); *G06V 10/751* (2022.01); *G06V 20/588* (2022.01); *B60W 2520/14* (2013.01); *G06T 2207/30256* (2013.01)

(58) Field of Classification Search
  CPC ............. B60W 2520/14; B60W 40/10; B60W 2552/53; G06T 7/70; G06T 7/74; G06T 2207/30256; G06V 10/751; G06V 20/588
  USPC ......................................................... 701/445
  See application file for complete search history.

(56) References Cited

U.S. PATENT DOCUMENTS

| | | | |
|---|---|---|---|
| 2014/0303828 A1* | 10/2014 | Joshi | G05D 1/021 701/23 |
| 2016/0209846 A1* | 7/2016 | Eustice | G05D 1/0248 |
| 2016/0327400 A1* | 11/2016 | Shikimachi | G09B 29/106 |
| 2018/0024562 A1* | 1/2018 | Bellaiche | G05D 1/0088 701/26 |
| 2018/0067966 A1* | 3/2018 | Oder | G05D 1/0276 |

FOREIGN PATENT DOCUMENTS

| | | |
|---|---|---|
| JP | 2012-122760 A | 6/2012 |
| JP | 2012-127845 A | 7/2012 |
| JP | 2017-016226 A | 1/2017 |
| JP | 2018-155731 A | 10/2018 |

* cited by examiner

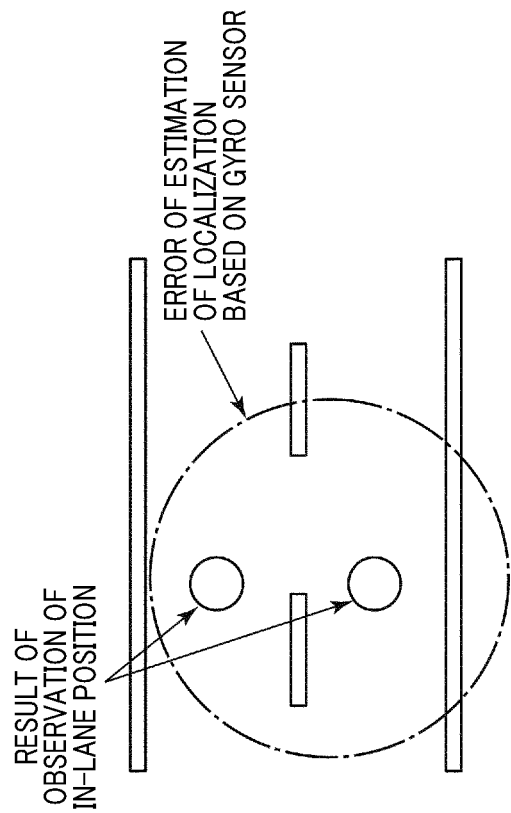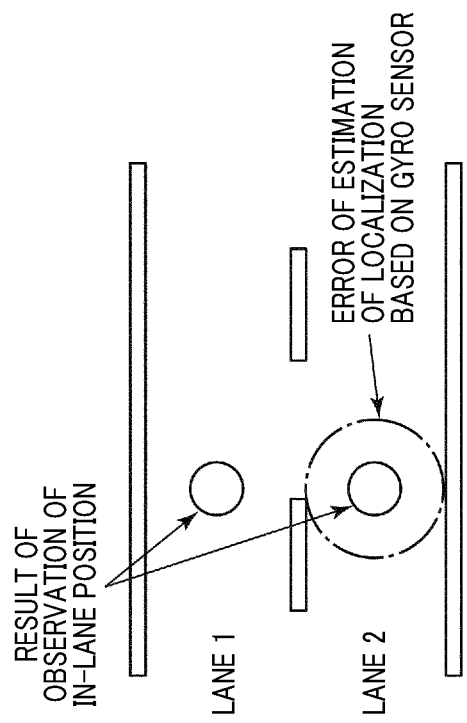

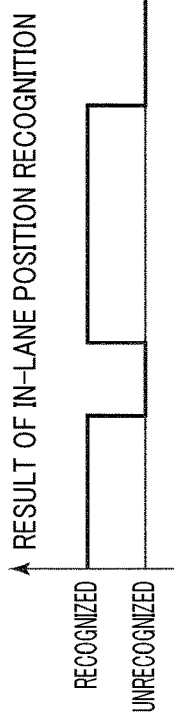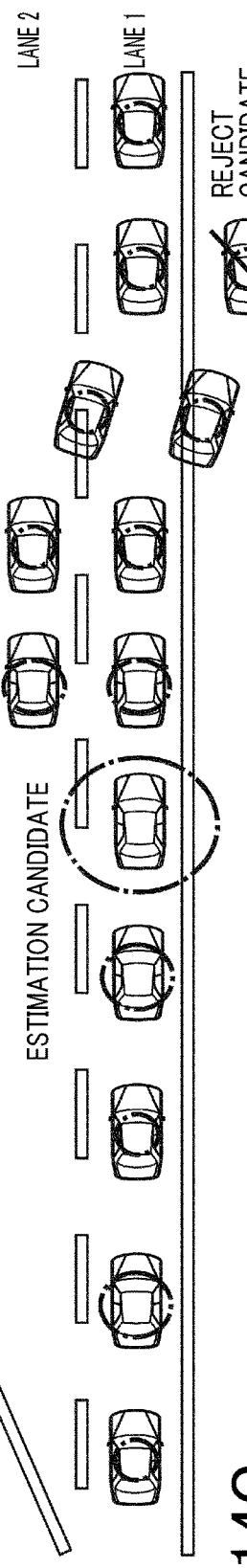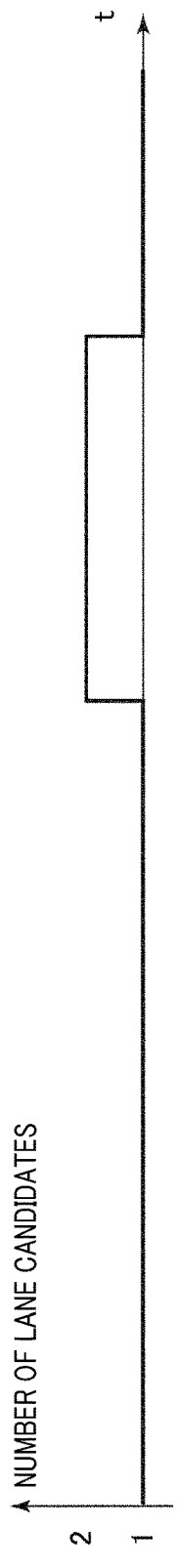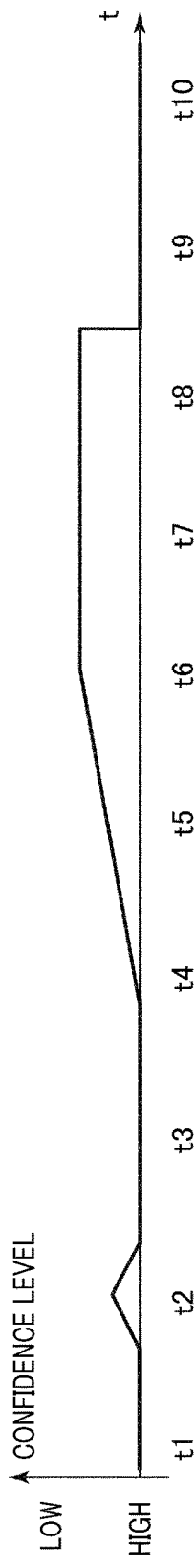

SELF-LOCALIZATION ESTIMATION DEVICE

CROSS REFERENCE TO RELATED APPLICATIONS

The present application is a continuation application of International Application No. PCT/JP2018/010068, filed on Mar. 14, 2018, which claims priorities to Japanese Patent Application No. 2017-248745 filed on Dec. 26, 2017, Japanese Patent Application No. 2017-248744 filed on Dec. 26, 2017, and Japanese Patent Application No. 2017-051066 filed on Mar. 16, 2017. The contents of these patent applications are incorporated herein by reference in their entirety.

BACKGROUND

Technical Field

The present disclosure relates to a self-localization estimation device.

Background Art

In a self-localization estimation device, an azimuth of a white line contained in images taken with use of a camera is calculated, and error estimation is performed by a Kalman filter based on a difference between an azimuth of a white line which is stored in an azimuth database, and the azimuth of the white line which is calculated from the images.

SUMMARY

According to the present disclosure, there is provided a self-localization estimation device including: a map-information acquisition unit that acquires map information including lane information; an in-lane localization detection unit that detects in-lane localization information for specifying an in-lane position of an own vehicle; an absolute localization estimation unit that estimates absolute-localization information for specifying an absolute position of the own vehicle and an error in the absolute localization; a self-localization estimation unit that: determines, based on mutual relationships between the in-lane position and the absolute position including the error, whether there is lane-relevant candidate information, the lane-relevant candidate information representing that one or more in-vehicle positions are each estimated to be in which of lanes identified by the lane information; and estimates, based on a result of the determination of whether there is lane-relevant candidate information, a localization of the own vehicle corresponding to the map information.

BRIEF DESCRIPTION OF THE DRAWINGS

FIG. 9 Each of FIG. 9A and FIG. 9B is an explanatory chart showing the self-localization estimation in the second embodiment.

FIG. 14 Each of FIG. 14A, FIG. 14B, FIG. 14C and FIG. 14D is an explanatory chart showing the self-localization estimation in the second embodiment.

DETAILED DESCRIPTION OF THE PREFERRED EMBODIMENTS

Figure 1:
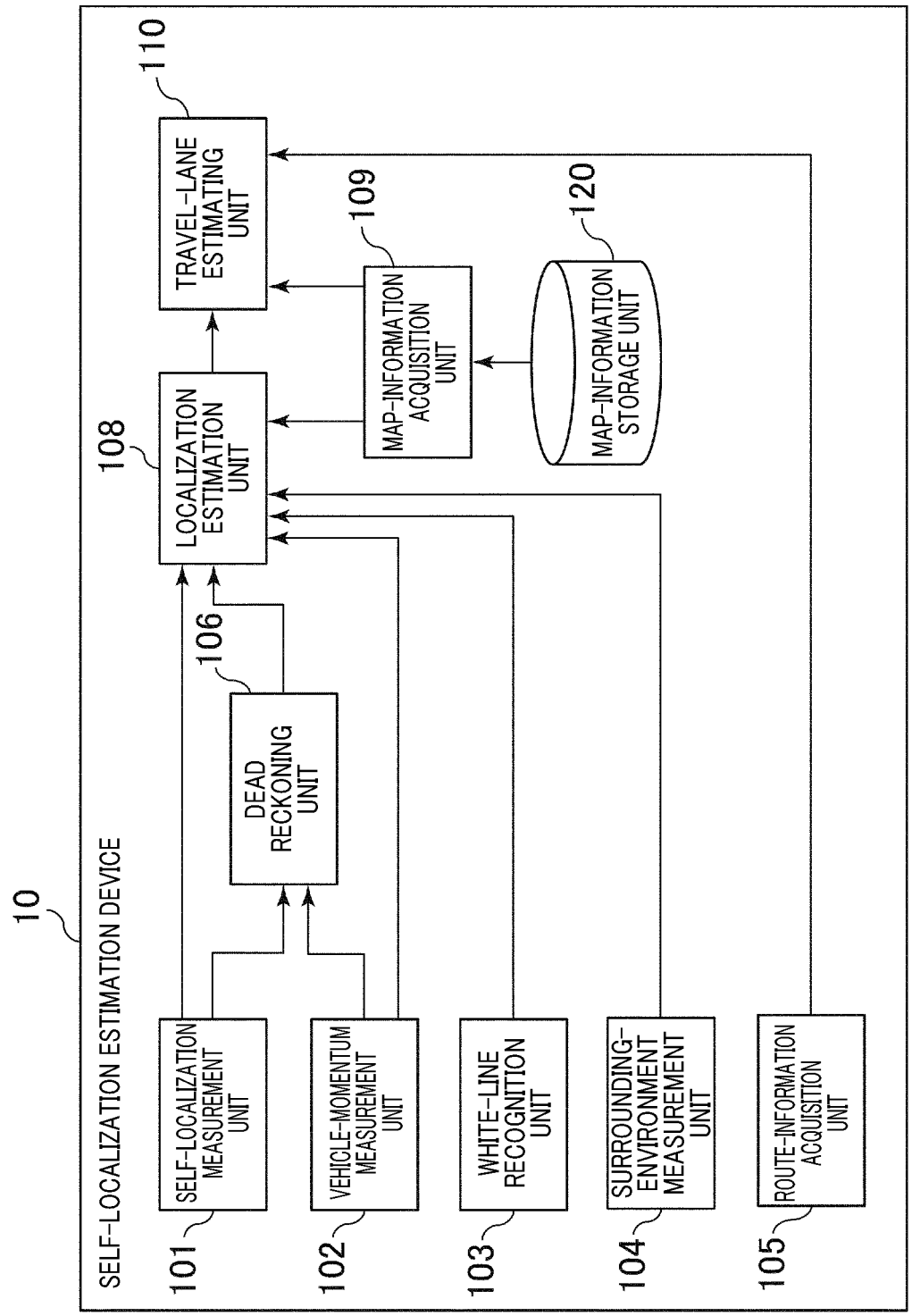
FIG. 1 is a block configuration diagram showing a functional configuration of a self-localization estimation device according to a first embodiment.

The self-localization estimation device described in Patent Literature 1 cited below has been also known as a device for self-localization estimation of a vehicle. The self-localization estimation device described in Patent Literature 1 cited below is configured to execute, based on a Global Positioning System (GPS), an inertial device, and vehicle-speed pulses, calculation of the self-localization with the use of existing road infrastructure, such as on-load white lines and road signs, to thereby increase the self-localization of the vehicle.

[PTL 1] JP 2008-249639 A

In Patent Literature 1, since the above error estimation uses the images taken by the camera, the above error estimation cannot correctly estimate an error when the images cannot be clearly acquired as in the case of bad weather. In particular, the necessity of lane-level estimation of the localization may cause the technology described in Patent Literature 1 to be unsuitable. In advanced driver assistance and autonomous driving, lane identification and in-lane localization are needed, and hence higher-accuracy self-localization estimation is required.

The present disclosure seeks to provide a self-localization estimation device capable of estimating lane-level localization with high accuracy.

According to the present disclosure, there is provided a self-localization estimation device including:

a map-information acquisition unit that acquires map information including lane information for specifying lanes in which vehicles are enabled to travel;

an in-lane localization detection unit that detects in-lane localization information for specifying an in-lane position of an own vehicle, the in-lane position being a position of the own vehicle in a lane in which the own vehicle is travelling;

an absolute localization estimation unit that estimates absolute-localization information for specifying an absolute position of the own vehicle and an error in the absolute localization;

a self-localization estimation unit that:
  estimates, based on the map information, the in-lane localization information, and the absolute-localization information, a position of the own vehicle corresponding to lane information included in the map information;

determines, based on mutual relationships between the in-lane position and the absolute position including the error, whether there is lane-relevant candidate information, the lane-relevant candidate information representing that one or more in-vehicle positions are each estimated to be in which of lanes identified by the lane information; and estimates, based on a result of the determination of whether there is lane-relevant candidate information, a localization of the own vehicle corresponding to the map information.

Since the presence/absence of the lane corresponding candidate that indicates to which of the lanes the in-lane position corresponds is determined, the position of the own vehicle can be estimated in consideration of the in-lane position in the lane corresponding candidate and the absolute position.

Note that, "Summary" and "What is claimed is" are not limited by the "Detailed Description of the Preferred Embodiments" described hereinbelow.

Now, an embodiment of the present disclosure is described with reference to the accompanying drawings. For the sake of ease of understanding the description, the same components in each of the drawings are denoted by the same reference symbols as much as possible to omit redundant description thereof.

With reference to FIG. 1, a self-localization estimation device 10 according to this embodiment is described. The self-localization estimation device 10 is configured as a computer that includes, as hardware components, computing units such as a CPU, storage units such as a RAM and a ROM, and interface units for exchanging data with various sensors. Now, functional components of the self-localization estimation device 10 are described.

The self-localization estimation device 10 includes a self-location measurement unit 101, a vehicle-momentum measurement unit 102, a white-line recognition unit 103, a surrounding-environment measurement unit 104, a route-information acquisition unit 105, a dead reckoning unit 106, a localization estimation unit 108, a map-information acquisition unit 109, a travel-lane estimating unit 110, and a map-information storage unit 120.

The self-location measurement unit 101 measures a location of an own vehicle by using a Global Navigation Satellite System (GNSS). The self-location measurement unit 101 calculates an own-vehicle measurement position being a navigation measurement position of the own vehicle in response to navigation signals that are received from a plurality of navigation satellites. The self-location measurement unit 101 outputs the calculated own-vehicle measurement position to the dead reckoning 106 and the localization estimation unit 108.

The vehicle-momentum measurement unit 102 measures a momentum of the own vehicle by receiving signals from the sensors such as an acceleration sensor, a vehicle-speed sensor, and a gyro sensor. The vehicle-momentum measurement unit 102 outputs information about the momentum, which includes a vehicle speed, an azimuth, a yaw rate, and an acceleration of the own vehicle, to the dead reckoning 106 and the self-localization unit 108.

The white-line recognition unit 103 recognizes, by using data of images taken by a camera, white lines that mark lanes. The white-line recognition unit 103 outputs, to the self-localization unit 108, information about whether the white lines are drawn, and information about patterns of the white lines.

The surrounding-environment measurement unit 104 measures information about weather and information about a positional arrangement of the satellites. The surrounding-environment measurement unit 104 outputs, to the self-localization unit 108, the information about the weather, and the information about the positional arrangement of the satellites.

The route-information acquisition unit 105 acquires, from a navigation system, a destination of the vehicle, and a route to the destination. The route-information acquisition unit 105 outputs, to the travel-lane estimating unit 110, information indicating the destination and the route.

The dead reckoning unit 106 receives the own-vehicle measurement positions output from the self-localization measurement unit 101 and on the information about the momentum, which are output from the vehicle-momentum measurement unit 102. Then, the dead reckoning unit 106 calculates, based on the own-vehicle measurement positions and the information about the momentum, information indicative of positions of the own vehicle at respectively corresponding places where it is difficult to perform localization of the own vehicle with use only of the GNSS. The dead reckoning unit 106 outputs the calculated information to the localization unit 108 as self-gyroscopic localization information.

The map-information acquisition unit 109 acquires a map information including the lane information for specifying lanes in which vehicles can travel. The map-information acquisition unit 109 reads the map information stored in the map-information storage unit 120, and outputs the read map-information to the localization unit 108 and the travel-lane estimating unit 110.

The localization unit 108 estimates, based on the map information and the own-vehicle measurement position and/or the self-gyroscopic localization information, corrected own-vehicle positions, each of which is a corrected position of the own vehicle. The localization unit 108 localizes each corrected own-vehicle position by superimposing a reliability of the corresponding map information and a reliability of the corresponding own-vehicle measurement position and/or a reliability of the corresponding self-gyroscopic localization information on one another. Each of the reliability of the map information and the reliability of an absolute position of the own vehicle may be represented by a corresponding probability distribution, or by a corresponding numerical value.

Figure 2:
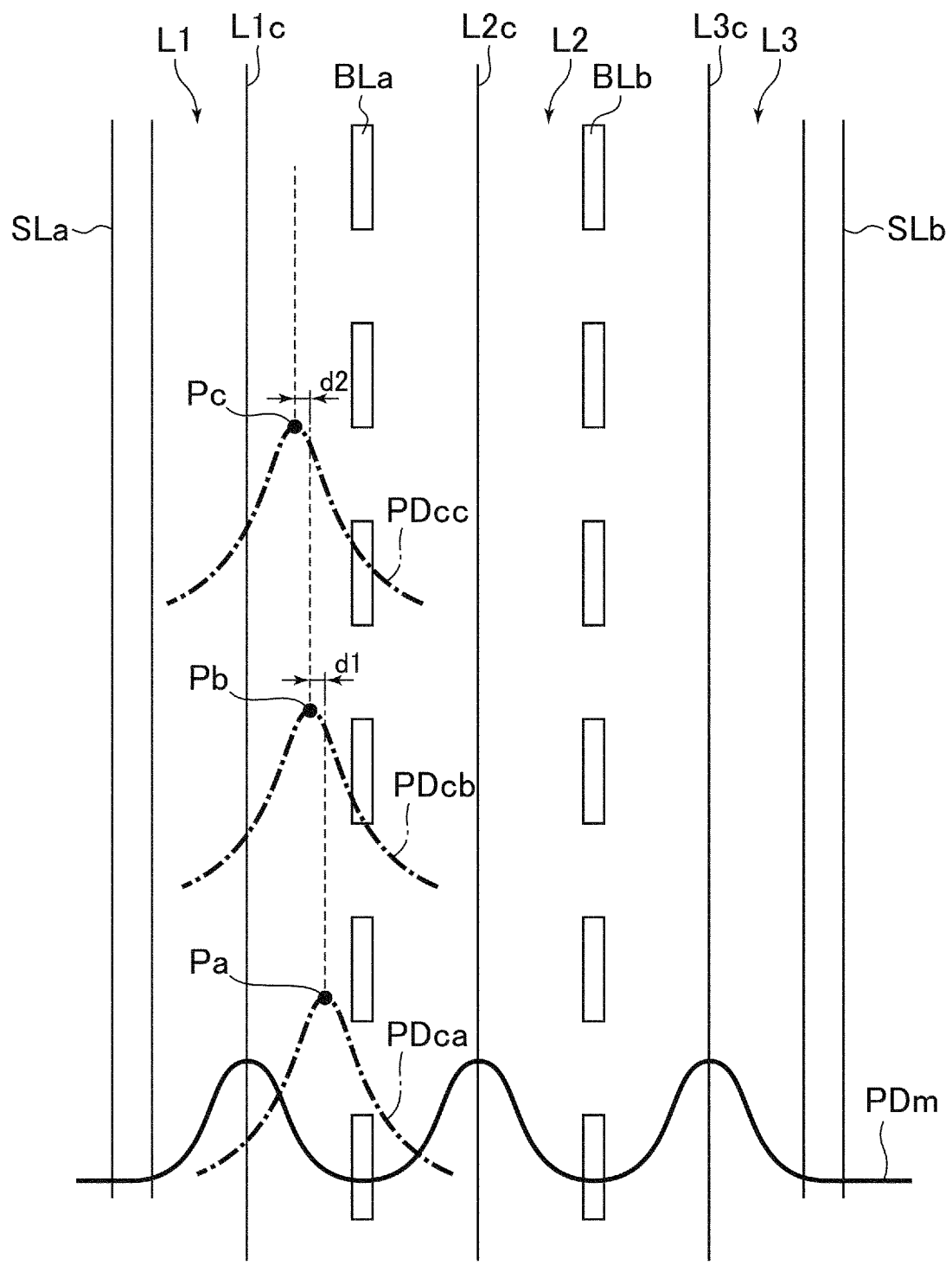
FIG. 2 is an explanatory chart showing self-localization estimation in the first embodiment.

With reference to FIG. 2, an example of a technique for localization of the corrected own-vehicle positions by the localization unit 108 is described. In FIG. 2, three lanes L1, L2, and L3 are set. A solid white line SLa is drawn on the left in an advancing direction in the lane L1. A broken white line BLa is drawn between the lane L1 and the lane L2. A broken white line BLb is drawn between the lane L2 and the lane L3. A solid white line SLb is drawn on the right in the advancing direction in the lane L3. A lane center line L1c is a line indicating a center of the lane L1. A lane center line L2c is a line indicating a center of the lane L2. A lane center line L3c is a line indicating a center of the lane L3.

In the example shown in FIG. 2, a map-information probability distribution PDm of the lane center line L1c, the lane center line L2c, and the lane center line L3c is used to represent the reliability of the map information. First, the own vehicle is positioned at an own-vehicle measurement position Pa. For the sake of convenience of description, the own vehicle is advancing from the own-vehicle measurement position Pa along the lane L1. Note that the self-gyroscopic localization information may be used instead of the own-vehicle measurement position.

At a first estimation timing, the localization unit 108 performs localization of a corrected own-vehicle position Pb by superimposing an own-vehicle-position probability distribution PDca at the own-vehicle measurement position Pa on the map-information probability distribution PDm.

This enables the own-vehicle position Pa before the localization at the first estimation timing to be corrected to the own-vehicle position Pb. The corrected own-vehicle position Pb is located to be closer to the lane center line L1c by a distance d1.

At a subsequent estimation timing, the localization unit 108 performs localization of a corrected own-vehicle position Pc by superimposing an own-vehicle-position probability distribution PDcb at the corrected own-vehicle position Pb on the map-information probability distribution PDm. This enables the corrected own-vehicle position Pb before the localization at the subsequent timing to be corrected to the own-vehicle position Pc. The corrected own-vehicle position Pc is located to be closer to the lane center line L1c by a distance d2.

As the map probability distribution, not only the probability distribution of a lane center line, but also a probability distribution representing the reliability of the map information is used. Further, a map-information probability distribution, which is offset relative to an original one in accordance with habits of drivers or a road profile may be used. The road profile includes an information about a road width, and an information about presence/absence of an adjacent lane.

Figure 3:
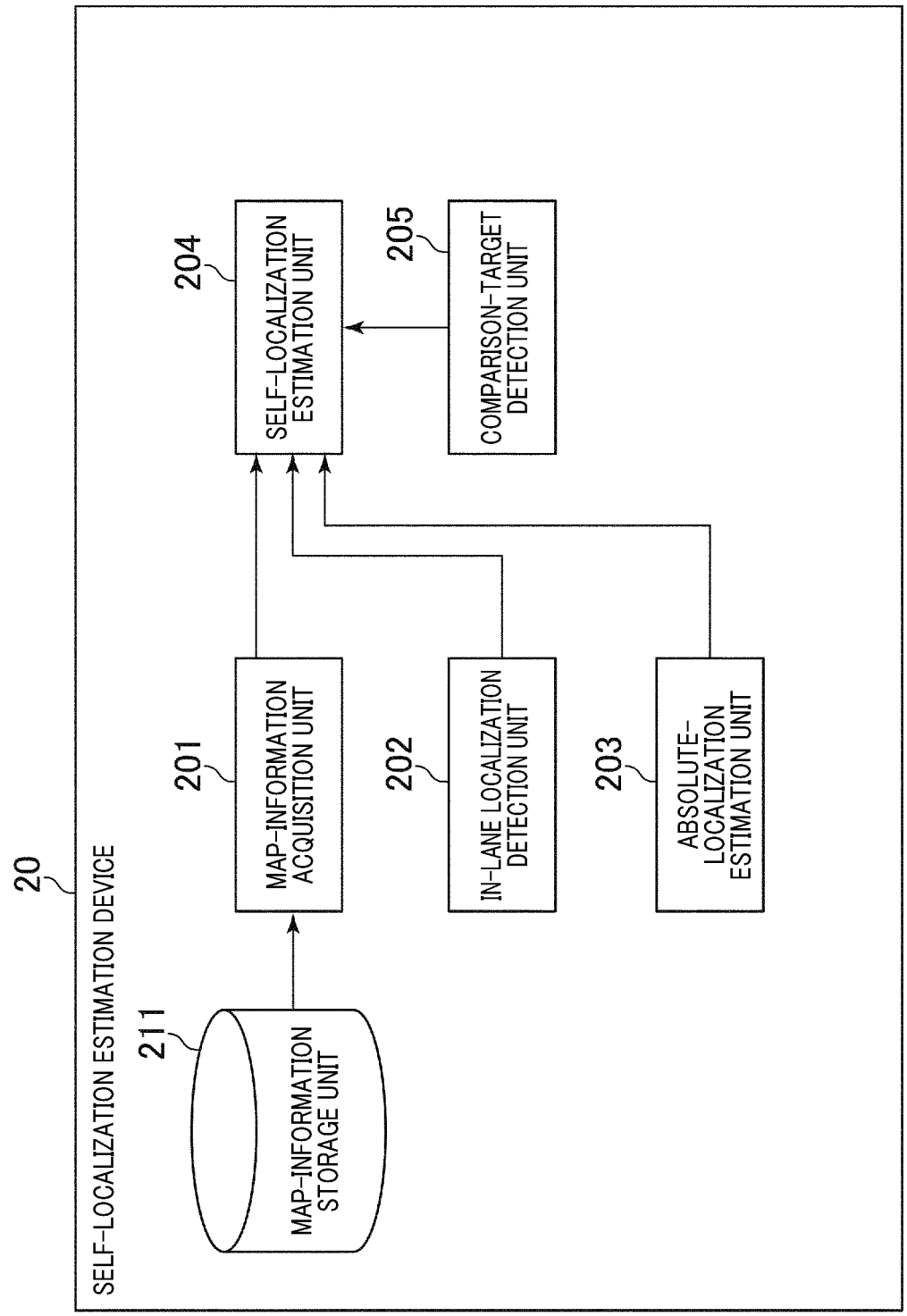
FIG. 3 is a block configuration diagram showing a functional configuration of a self-localization estimation device according to a second embodiment.

Next, the following describes a self-localization estimation device 20, which is a modification of the self-localization estimation device 10, according to the second embodiment with reference to FIG. 3

The self-localization estimation device 20 is configured as a computer that includes, as hardware components, computing units such as a CPU, storage units such as RAM and ROM, and interface units for exchanging data with the various sensors. Now, functional components of the self-localization estimation device 20 are described.

The self-localization estimation device 20 includes a map-information acquisition unit 201, an in-lane localization detection unit 202, an absolute localization estimation unit 203, a self-localization estimation unit 204, a comparison-target detection unit 205, and a map-information storage unit 211.

The map-information acquisition unit 201 acquires a map information including a lane information for specifying lanes in which vehicles can travel. The map-information acquisition unit 201 reads the map information stored in the map-information storage unit 211, and outputs the read map-information to the self-localization estimation unit 204.

The in-lane localization detection unit 202 detects an in-lane localization information for specifying an in-lane position of the own vehicle, which is a position of the own vehicle in the lane in which the own vehicle is travelling. The in-lane localization detection unit 202 detects the in-lane localization information based on a surrounding environment and/or on a situation of the lane, which are captured by a camera. The in-lane localization detection unit 202 outputs the in-lane localization information to the self-localization estimation unit 204.

Figure 5:
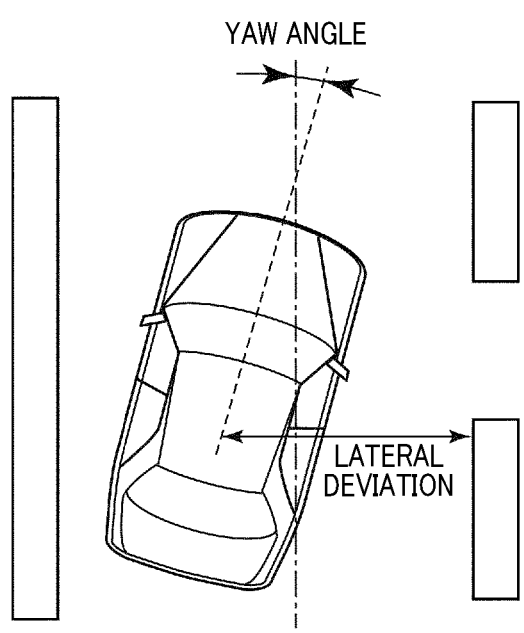
FIG. 5 is an explanatory chart showing the self-localization estimation in the second embodiment.

As shown in FIG. 5, the in-lane localization detection unit 202 specifies the in-lane location of the own vehicle from a lateral deviation and a yaw angle of the own vehicle to accordingly generate the in-lane localization information.

The absolute localization estimation unit 203 shown in FIG. 3 estimates an absolute-localization information for specifying the absolute localization and its error of the own vehicle. The absolute localization estimation unit 203 outputs the estimated absolute-localization information to the self-localization estimation unit 204. The absolute localization estimation unit 203 is capable of estimating the absolute localization information by various methods.

The absolute localization estimation unit 203 may estimate, using the GNSS, the absolute-localization information for specifying the absolute localization and its error of the own vehicle. The absolute localization estimation unit 203 may calculate the own-vehicle measurement position being the navigation measurement position of the own vehicle in accordance with the navigation signals received from the plurality of navigation satellites, and may estimate the absolute-localization information based on this own-vehicle measurement position.

The absolute localization estimation unit 203 may measure the momentum of the own vehicle based on the signals received from the sensors such as the acceleration sensor, the vehicle-speed sensor, and the gyro sensor. The absolute localization estimation unit 203 calculates, based on the own-vehicle measurement position and on the information indicating the momentum of the own vehicle, a position of the own vehicle at a corresponding place where it is difficult to perform the localization with use only of the GNSS. Then, the absolute localization estimation unit 203 estimates, based on the calculated position as a self-gyroscopic localization, the absolute-localization information.

Figure 4:
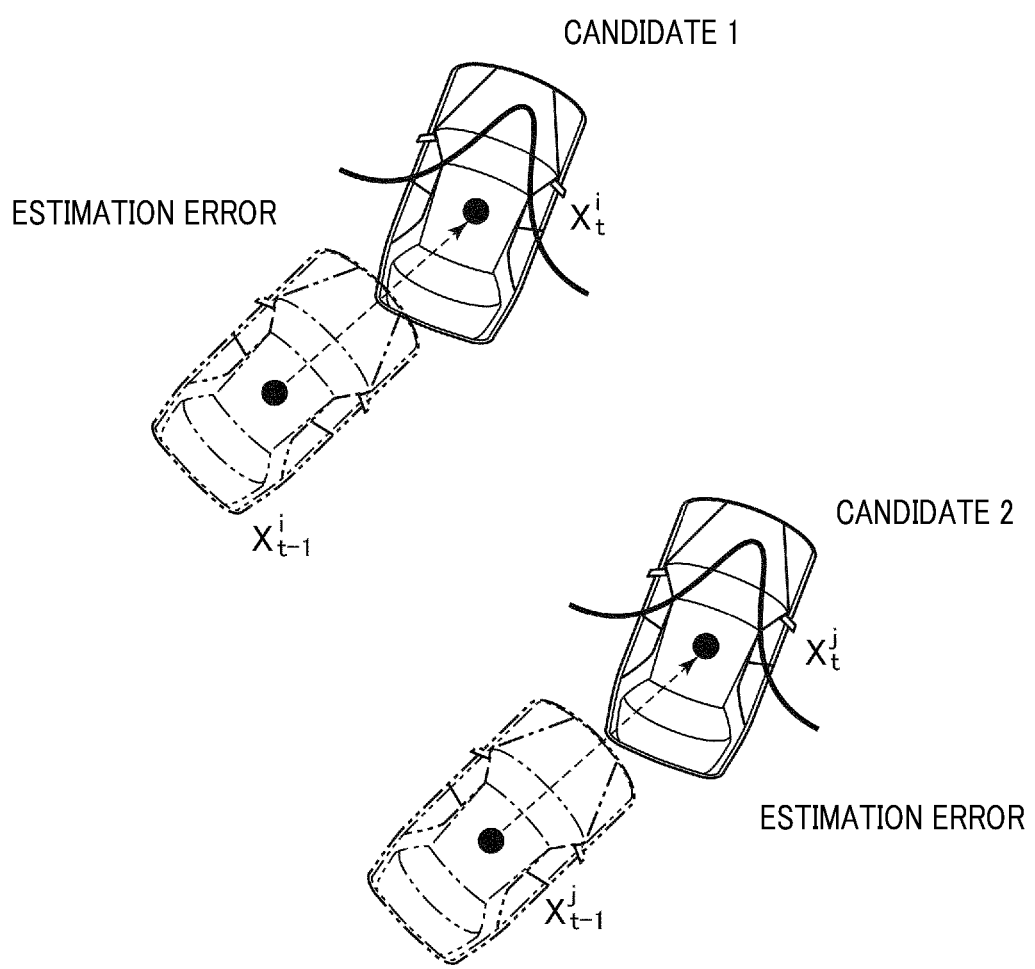
FIG. 4 is an explanatory chart showing self-localization estimation in the second embodiment.

FIG. 4 shows an example of how the absolute localization estimation unit 203 performs the estimation. As shown in FIG. 4, the absolute localization estimation unit 203 localizes a "candidate 1" as a first example of the absolute-localization information, and a "candidate 2" as a second example of the absolute-localization information. The candidate 1 includes an estimated current position $X^i_t$ from a previous position $X^i_{t-1}$ based on the momentum of the own vehicle. The estimated current position $X^i_t$ is a position information including an estimation error. The candidate 2 includes an estimated current position $X^j_t$ from a previous position $X^j_{t-1}$ in consideration of the momentum of the own vehicle. The current position $X^j_t$ is a position information including an estimation error.

The self-localization estimation unit 204 shown in FIG. 3 estimates, based on the map information, the in-lane localization information, and the absolute-localization information, a position of the own vehicle, which corresponds to the lane information included in the map information.

Specifically, the self-localization estimation unit 204 determines, based on mutual relationships between the in-lane position and the absolute localization including its error, whether there is lane-relevant candidate information. The lane-relevant candidate information represents that one or more in-vehicle positions are each estimated to be in which of the lanes identified by the lane information. Then, the self-localization estimation unit 204 estimates, based on a result of this determination, the localization of the own vehicle, which corresponds to the map information. In a case where there is no lane-relevant candidate information, the self-localization estimation unit 204 can be configured to determine that there is a malfunction in at least one of the sensors.

The following describes an example of a method indicative of how the self-localization estimation unit 204 estimates the position of the own vehicle.

Figure 6:
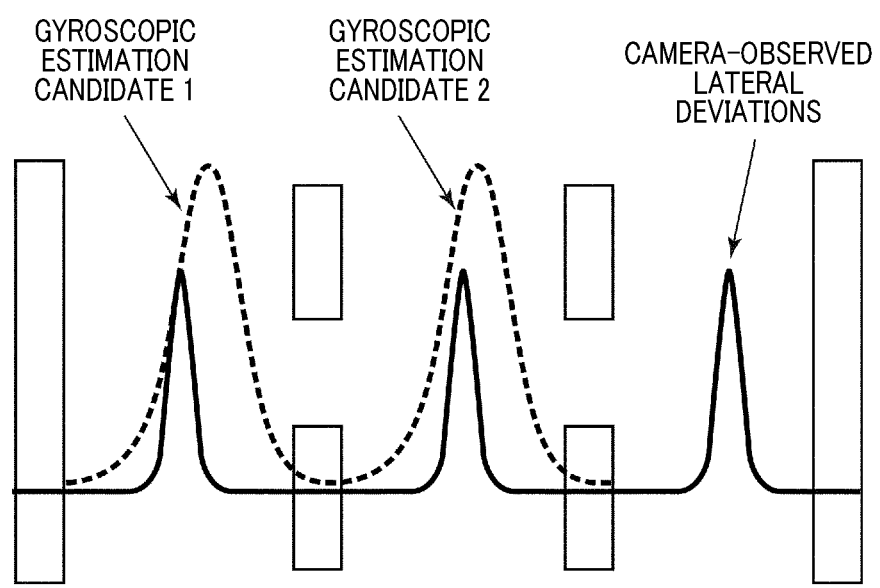
FIG. 6 is an explanatory chart showing the self-localization estimation in the second embodiment.
Figure 7:
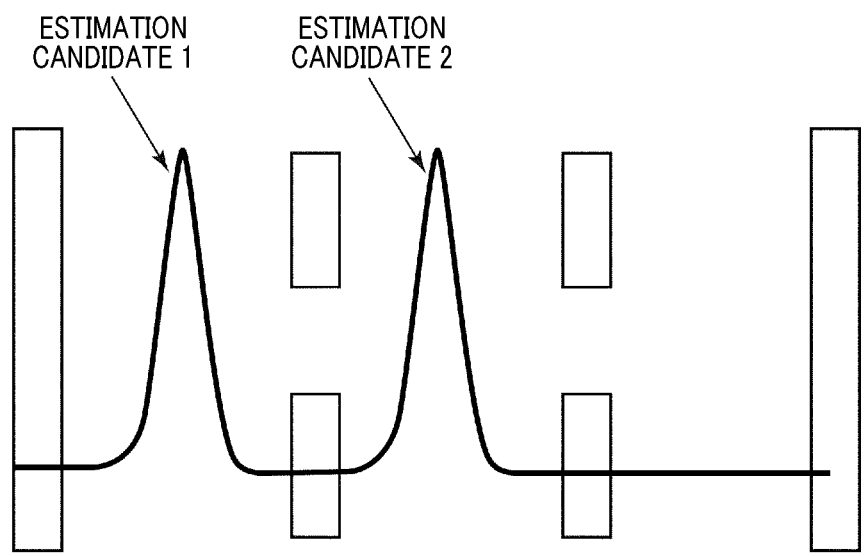
FIG. 7 is an explanatory chart showing the self-localization estimation in the second embodiment.

A "first gyroscopic estimation candidate" and a "second gyroscopic estimation candidate" shown in FIG. 6 respectively correspond to the "candidate 1" and the "candidate 2" shown in FIG. 4. Superimposing each of the estimation error of the "candidate 1" and the estimation error of the "candidate 2" in FIG. 4 onto the map information enables the first gyroscopic estimation candidate and the second gyroscopic estimation candidate to be obtained.

Additionally, superimposing the "lateral deviation" shown in FIG. 5 for each of the lanes onto the map information also enables a "camera-observed lateral deviation" for each of the lanes to be obtained (see FIG. 6).

Figure 8:
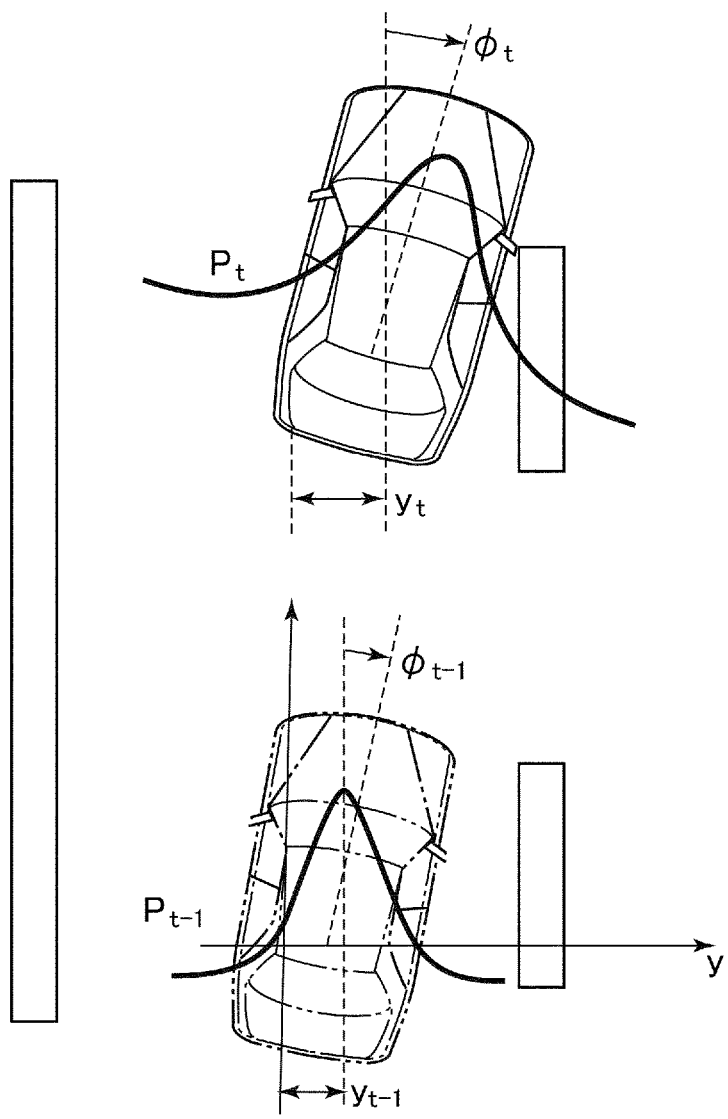
FIG. 8 is an explanatory chart showing the self-localization estimation in the second embodiment.

The following describes how the estimated localization by the gyro sensor and its error are calculated as the absolute localization information with reference to FIG. 8. In FIG. 8, $P_{t-1}$ is a covariance matrix of a previous time, $y_{t-1}$ is a lateral position at the previous time, and $\varphi_{t-1}$ is an attitude angle at the previous time. By the following equation (1), a lateral position $y_t$ and an attitude angle $\varphi_t$ are calculated:

$$\begin{bmatrix} y_t \\ \phi_t \end{bmatrix} = \begin{bmatrix} 1 & V\Delta t \\ 0 & 1 \end{bmatrix} \begin{bmatrix} y_{t-1} \\ \phi_{t-1} \end{bmatrix} + \begin{bmatrix} V\Delta t^2/2 \\ \Delta t \end{bmatrix} \gamma + \varepsilon = GX + B\gamma + \varepsilon \qquad (1)$$

where $\varepsilon$ is system noise.

A covariance matrix $P_t$ of a value estimated by the gyro sensor is calculated by the following equation (2) with use of the covariance matrix $P_{t-1}$ at the previous time:

$$P_t = G^T P_{t-1} G + M \qquad (2)$$

where M is a covariance matrix of the system noise $\varepsilon$, which is set, for example, based on error characteristics of the gyro sensor, or the like, and T is a transposed matrix.

Sensor fusion of the information shown in FIG. 6 is performed using a Kalman filter A Kalman gain K of the Kalman filter is calculated by the following equation (3):

$$K = P_t H^T (HPH^T + Q)^{-1} \qquad (3)$$

where Q is an observation error matrix, which is set based on error characteristics of observation values of the in-lane position, and H is a 2×2 identity matrix.

With use of the Kalman gain K, a result of the estimation and the covariance matrix are calculated by the following equations (4) and (5):

$$\hat{Z}_t = Z_t + K\Delta Z \qquad (4)$$

$$\hat{P}_t = (I - KH) P_t \qquad (5)$$

where $Z_t$ is a vector obtained by vertically aligning the lateral position and the attitude angle that are detected by the gyro sensor. $\Delta Z$ is a difference between the observation value of the in-lane position and the attitude angle observed by the camera, and the corresponding result $Z_t$ of the estimation by the gyro sensor.

The result of the estimation by the gyro sensor, which is calculated set forth above, and the result of the observation of the in-lane position by the camera are correlated to each other. An example of the correlation is shown in FIGS. 9(A) and 9(B). In the example shown in FIG. 9(A), the error of the result of the estimation by the gyro sensor is small. Thus, the own vehicle is estimated to be present in a lane 2, and the estimation result by the gyro sensor and the observation result of the in-lane position by the camera in the lane 2 can be correlated to each other. In this case, the lane-relevant candidate information including the lane 2 is determined.

In contrast, in the example shown in FIG. 9(B), the error of the result of the estimation by the gyro sensor is large, and hence the own vehicle may be present in a first lane, or may be present in a second lane. Thus, there are (1) A first item of the lane-relevant candidate information representing that the own vehicle is present in the lane 1

(2) A second item of the lane-relevant candidate information representing that the own vehicle is resent in the lane 2

In this case, the lane-relevant candidate information including the lane 1 and the lane 2 is determined.

In this embodiment, the comparison-target detection unit 205 is provided to reject, when plural items of the lane-relevant candidates information are present, one or more items of the lane-relevant candidate information.

The comparison-target detection unit 205 detects a comparison-target information different from the information to be used in the detection of the in-lane localization information and the estimation of the absolute-localization information.

As the comparison-target information, for example, a line-type information for determining the lanes, the road-profile information in the map information, or a position information obtained by a GPS are used. The self-localization estimation unit 204 performs screening of the items of the lane-relevant candidate information by determining, based on the lane-relevant candidate information and the comparison-target information, whether at least one of the items of the lane-relevant candidate information satisfies a screening condition.

Figure 10:
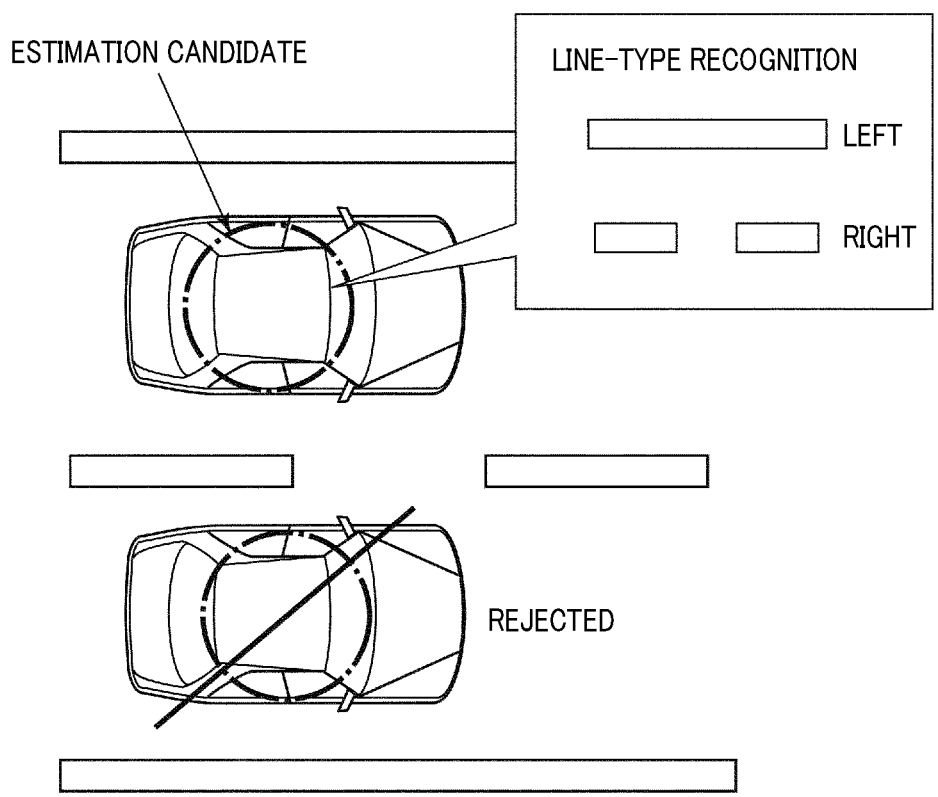
FIG. 10 is an explanatory chart showing the self-localization estimation in the second embodiment.

In an example shown in FIG. 10, in which two items of the lane-relevant candidate information for the respective adjacent two lanes are present, the line-type information is used as the comparison-target information. As the line-type information, the comparison-target detection unit 205 detects a solid line on the left, and a broken line on the right.

Based on the result of the recognition of the line types, the self-localization estimation unit 204 estimates that the own vehicle is present in a left lane located on the left in the travelling direction, and correspondingly rejects the item of the lane-relevant candidate information for a right lane located on the right in the travelling direction, thus selecting the remaining item of the lane-relevant candidate information. In this case, the item of the lane-relevant candidate information for the left lane located on the left in the travelling direction is selected.

Figure 11:
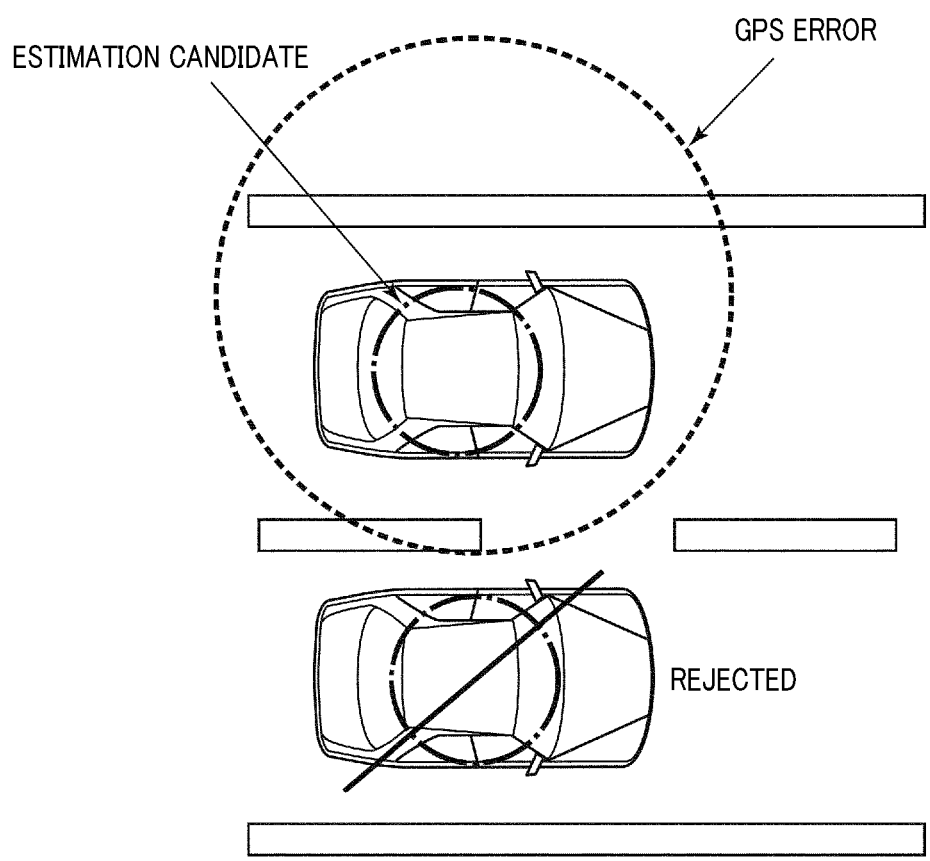
FIG. 11 is an explanatory chart showing the self-localization estimation in the second embodiment.

In an example shown in FIG. 11, in which two items of the lane-relevant candidate information for the respective adjacent two lanes are present, the GPS information is used as the comparison-target information. As the GPS information, the comparison-target detection unit 205 acquires a position information including errors indicated by a broken-line circle in FIG. 11.

Based on the GPS information, the own-vehicle-position estimating unit 204 estimates that the own vehicle is present in a left lane located on the left in the travelling direction, and correspondingly rejects the item of the lane-relevant candidate information for a right lane located on the right in the travelling direction, thus selecting the remaining item of the lane-relevant candidate information. In this case, the item of the lane-relevant candidate information for the left lane located on the left in the travelling direction is selected.

Figure 12:
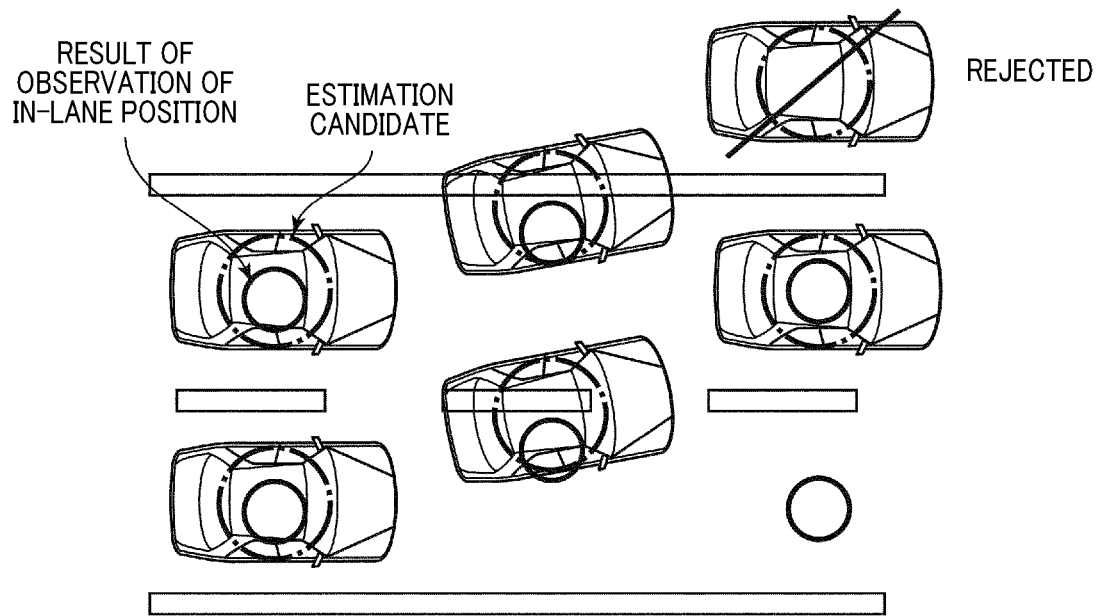
FIG. 12 is an explanatory chart showing the self-localization estimation in the second embodiment.

In an example shown in FIG. 12, in which two items of the lane-relevant candidate information for the respective adjacent two lanes are present, the map information is used as the comparison-target information. As the map information, the comparison-target detection unit 205 detects a profile of the corresponding road.

When an in-vehicle position located in the left lane in the travelling direction, which is included in the corresponding lane-relevant candidate information, has deviated from the map information along with a lapse of time, the self-localization estimation unit 204 rejects the item of the lane-relevant candidate information for the in-vehicle position located in the left lane, thus selecting the remaining item of the lane-relevant candidate information. In this case, the item of the lane-relevant candidate information for the right lane located on the right in the travelling direction is selected, and after a lane change is estimated, the item of the lane-relevant candidate information for the left lane is selected.

The self-localization estimation unit 204 is capable of notifying that confidence levels of the results of the estimation are low when plural items of the lane-relevant candidate information are present or when the amount of errors in the absolute localization is equal to or more than a predetermined margin.

Figure 13:
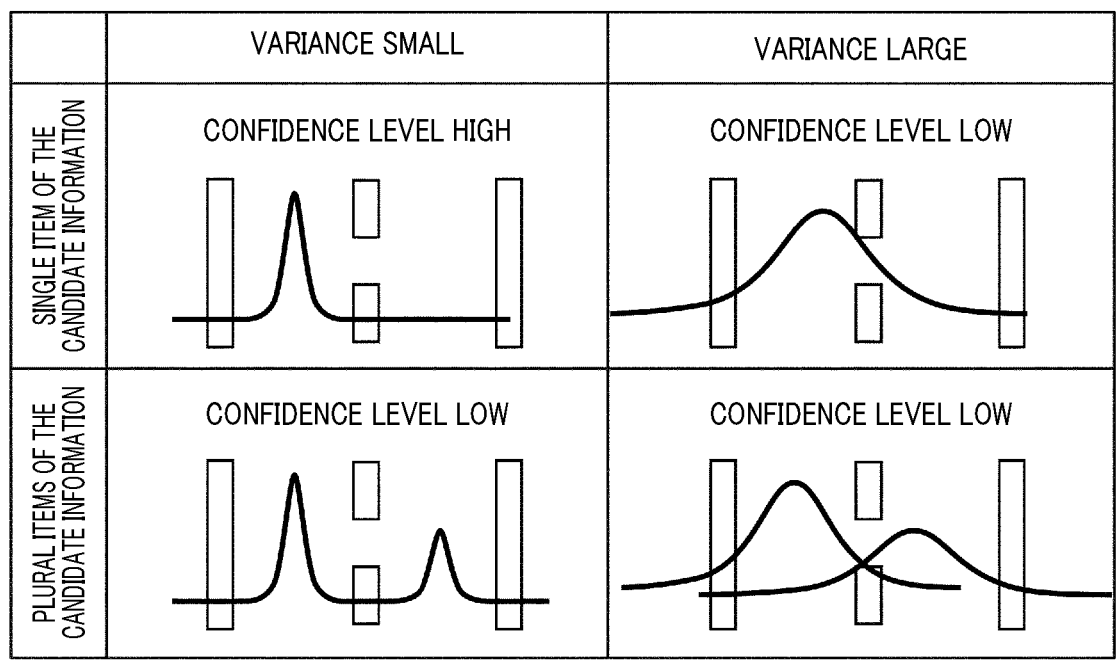
FIG. 13 is an explanatory chart showing the self-localization estimation in the second embodiment.

As shown in FIG. 13, when there is a single item of the lane-relevant candidate information, it is determined that the confidence level of the single item of the lane-relevant candidate information is high upon the variance of the errors is small. Even when a single item of the lane-relevant candidate information is present, it is determined that the confidence level is low as long as the variance of the errors is large.

When plural items of the lane-relevant candidate information are present, it is difficult to identify one of the items of the lane-relevant candidate information even when the variance of the errors is small, resulting in the confidence level being determined to be low. In addition, when plural items of the lane-relevant candidate information are present, and the variance of the errors is large, it is determined that the confidence level is low.

The following describes how the self-localization estimation device 20 operates with reference to FIGS. 14(A) to 14(D).

FIG. 14A shows how the result of in-lane position recognition is changed over time, FIG. 14B shows how the estimation result of localization of the own vehicle is changed over time, FIG. 14C shows how the number of items of the lane-relevant candidate information is changed over time, and FIG. 14D shows how the confidence level is changed At a time t1, the in-lane position is recognized. In this state, the position of the own vehicle is recognized in the right lane. At a time t2, the in-lane position is not recognized. Thus, in this state, errors of the position recognition of the own vehicle have increased, and hence the confidence level has decreased. At a time t3, the in-lane position is recognized again. Thus, the errors of the position recognition of the own vehicle have decreased, and hence the confidence level has increased. At a time t4, the in-lane position is not recognized, and in this state, the confidence level has decreased again.

At a time t5, an error of estimation of the localization based on the gyro sensor has increased, and hence there is a situation where it is difficult to identify which of the adjacent two lanes the own vehicle is present. At a time t6, both the adjacent two lanes are respectively determined as items of the lane-relevant candidate information. From the time t6 to a time t8, the estimation of the localization is continued with the number of the items of the lane-corresponding candidate information remaining two.

At a time t9, the right lane corresponding to one item of the lane-relevant candidate information has deviated from the map information, and hence the right lane corresponding to the one item of the lane-relevant candidate information is rejected. At a time t10 and thereafter, a lane change is performed from the left lane to the right lane, the estimation is continued with the item of the lane-relevant candidate information for the left lane being selected.

The self-localization estimation device 20 according to this embodiment includes the map-information acquisition unit 201, in-lane localization detection unit 202, absolute localization estimation unit 203, self-localization estimation unit 204, comparison-target detection unit 205, and map-information storage unit 211.

The map-information acquisition unit 201 acquires a map information including the lane information for specifying lanes in which vehicles can travel.

The in-lane localization detection unit 202 detects the in-lane localization information for specifying an in-lane position of the own vehicle, which is a position of the own vehicle in the lane in which the own vehicle is travelling.

The absolute localization estimation unit 203 estimates an absolute-localization information for specifying the absolute localization and its error of the own vehicle.

The self-localization estimation unit 204 estimates, based on the map information, the in-lane localization information, and the absolute-localization information, a position of the own vehicle, which corresponds to the lane information included in the map information.

Specifically, the self-localization estimation unit 204 determines, based on mutual relationships between the in-lane position and the absolute localization including its error, whether there is lane-relevant candidate information. The lane-relevant candidate information represents that one or more in-vehicle positions are each estimated to be in which of the lanes identified by the lane information. Then, the self-localization estimation unit 204 estimates, based on a result of this determination, the localization of the own vehicle, which corresponds to the map information.

It is possible to determine whether there is lane-relevant candidate information that represents that one or more in-vehicle positions are each estimated to be in which of the lanes identified by the lane information. This therefore enables the localization of the own vehicle to be estimated based on the absolute position of the own vehicle and the in-lane position included in the lane-relevant candidate information.

In this embodiment, the self-localization estimation unit 204 determines whether there is lane-relevant candidate information based on a degree of superimposition between at least one in-lane position including its error distribution and the absolute position including its error distribution. This superimposition enables the localization of the own vehicle to be estimated based on the errors.

The self-localization estimation unit 204 of this embodiment is configured to (1) Continue, upon determining that there are two items of the lane-relevant candidate information, estimation of the localization of the own vehicle until at least one of the items of the lane-relevant candidate information satisfies a screening condition (2) Perform a screening of the items of the lane-relevant candidate information upon at least one of the items of the lane-relevant candidate information satisfies the screening condition This configuration makes it possible to select at least one of the items of the lane-relevant candidate information, when the at least one of the items of the lane-relevant candidate information satisfies the screening condition, thus rejecting the selected at least one of the items of the lane-relevant candidate information. This results in reduction of a load required to estimate the localization of the own vehicle in accordance with the items of the lane-relevant candidate information.

The self-localization estimation device 20 according to this embodiment further includes the comparison-target detection unit 205 that detects the comparison-target information different from the information to be used in the detection of the in-lane localization information and the estimation of the absolute-localization information. The self-localization estimation unit 204 determines whether at least one of the items of the lane-relevant candidate information satisfies the screening condition in accordance with the comparison-target information, and performs screening of the items of the lane-relevant candidate information in accordance with a result of the determination.

This configuration enables screening of the items of the lane-relevant candidate information to be carried out in accordance with the comparison-target information as an additional screening determination information. Increasing a confidence level of the comparison-target information enables one or more unnecessary items of the lane-relevant candidate information to be rejected.

The comparison-target detection unit 205 of this embodiment detects, as the comparison-target information for each item of the lane-relevant candidate information, a travelling line-pattern information that is detected from an image taken by an imaging device installed in the own vehicle. The travelling line-pattern information specifies a line pattern of at least one lane boundary line that marks a lane in which the own vehicle is travelling.

The comparison-target detection unit 205 also detects, from the lane information, a map line-pattern information for specifying a line pattern of at least one lane boundary line included in the lane information.

The self-localization estimation unit 204 determines whether the travelling line-pattern information for each item of the lane-relevant candidate information mismatches the map line-pattern information, and rejects one of the items of the lane-relevant candidate information upon the travelling line-pattern information for the one of the items of the lane-relevant candidate information mismatching the map line-pattern information.

For example, when a broken line on the right and left as viewed from the own vehicle is specified based on a map line-pattern information, and meanwhile, when a continuous line and a broken line are specified respectively as a line pattern on the right and a line pattern on the left based on the travelling line-pattern information for one of the items of the lane-relevant candidate information, the map line-pattern information does not mismatch the travelling line-pattern information for one of the items of the lane-relevant candidate information. It is possible to determine that the screening condition has been satisfied for the one of the items of the lane-relevant candidate information. Because a confidence level of the travelling line-pattern information to be detected from the image taken by the imaging device is likely to be high, and hence unnecessary items of the lane-relevant candidate information can be rejected.

The absolute localization estimation unit 203 of this embodiment estimates the absolute-localization information based on the detection results by the gyro sensor. The comparison-target detection unit 205 detects the comparison-target information based on the navigation signals that are received from the plurality of navigation satellites. When the position of the own vehicle which is specified based on the comparison-target information and one item of the lane-relevant candidate information deviate from each other, the self-localization unit 204 determines that the screening condition has been satisfied for the one item of the lane-relevant candidate information, thus rejecting the deviated one item of the lane-relevant candidate information.

Since the comparison-target information is generated based on the navigation signals that are received from the plurality of navigation satellites, when the navigation signals are received in good condition, a confidence level higher than that of the absolute-localization information based on the results of the estimation by the gyro sensor can be achieved. This results in rejection of one or more unnecessary items of the lane-relevant candidate information.

In this embodiment, when there are items of the lane-relevant candidate information, and when at least one item of the lane-relevant candidate information deviates from the lane information, the self-localization unit 204 determines that the screening condition has been satisfied for the at least one item of the lane-relevant candidate information, thus rejecting the deviated at least one item of the lane-relevant candidate information.

When there are items of the lane-relevant candidate information, and when some items of the lane-relevant candidate information deviate from the lane information included in the map information, it is possible to select another one of the items of the lane-relevant candidate information, which is superimposed on the lane information, thus rejecting the deviated items of the lane-relevant candidate information. This results in rejection of one or more unnecessary items of the lane-relevant candidate information.

In this embodiment, the self-localization unit 204 notifies that the confidence levels of the results of the estimations are low when plural items of the lane-relevant candidate information are present or when the amount of the error of the absolute position is equal to or more than a predetermined margin. Notifying that the confidence levels of the results of the estimations are low enables a user to recognize that the confidence levels have decreased.

With regard to the description of the embodiment of the present disclosure, which has been made hereinabove by way of the specific examples, the present disclosure is not limited to these specific examples. As long as the features of the present disclosure are included, design variations of these specific examples, which persons skilled in the art make as appropriate, are also encompassed within the scope of the present disclosure. The components, their arrangement, conditions, shapes, and the like are not limited to those exemplified in the above-described specific examples, and may be changed as appropriate. Unless a technical contradiction arises, combinations of the components in the above-described specific examples may be changed as appropriate.

What is claimed is:

1. A self-localization estimation device comprising:
a processor;
a non-transitory computer-readable storage medium; and
a set of computer-executable instructions stored on the non-transitory computer-readable storage medium that cause the processor to:
acquire map information including lane information specifying lanes in which vehicles are enabled to travel;
detect in-lane localization information specifying an in-lane position of an own vehicle, the in-lane position being a position of the own vehicle in a lane in which the own vehicle is travelling;

estimate absolute-localization information specifying an absolute localization of the own vehicle and an error in the absolute localization;

determine whether there is lane-relevant candidate information, based on a degree of overlap between the in-lane position including a first error distribution thereof and the absolute localization including a second error distribution thereof, the lane-relevant candidate information representing which lanes identified by the lane information that the in-lane position of the own vehicle corresponds to; and estimate, based on a result of the determination of whether there is lane-relevant candidate information, a position of the own vehicle with respect to the lane information included in the map information.

2. The self-localization estimation device according to claim 1, wherein:

the set of computer-executable instructions further cause the processor to:

continue, upon determining that there are two items of the lane-relevant candidate information, estimation of the localization of the own vehicle until at least one of the items of the lane-relevant candidate information satisfies a screening condition; and perform a screening of the items of the lane-relevant candidate information upon at least one of the items of the lane-relevant candidate information satisfies the screening condition.

3. The self-localization estimation device according to claim 2, wherein the set of computer-executable instructions further cause the processor to:

detect comparison-target information different from information to be used in the detection of the in-lane localization information and the estimation of the absolute-localization information;

determine whether at least one of the items of the lane-relevant candidate information satisfies the screening in accordance with the comparison-target information; and perform screening of the items of the lane-relevant candidate information in accordance with a result of the determination of whether at least one of the items of the lane-relevant candidate information satisfies the screening.

4. The self-localization estimation device according to claim 3, wherein the set of computer-executable instructions further cause the processor to:

detect, as the comparison-target information for each item of the lane-relevant candidate information, line-pattern information that is detected from an image taken by an imaging device installed in the own vehicle, the line-pattern information being a travelling line-pattern information specifying a line pattern of at least one lane boundary line that marks the lane in which the own vehicle is travelling;

detect, from the lane information, a map line-pattern information for specifying a line pattern of at least one lane boundary line included in the lane information;

determine whether the travelling line-pattern information for each item of the lane-relevant candidate information mismatches the map line-pattern information; and reject one of the items of the lane-relevant candidate information upon the travelling line-pattern information for the one of the items of the lane-relevant candidate information mismatching the map line-pattern information.

5. The self-localization estimation device according to claim 4, wherein the set of computer-executable instructions further cause the processor to:

estimate the absolute-localization information based on a detection result by a gyro sensor;

detect the comparison-target information based on navigation signals received from a plurality of navigation satellites; and determine that the screening condition is satisfied for one item of the lane-relevant candidate information upon determining that a position of the own vehicle specified based on the comparison-target information and the one item of the lane-relevant candidate information deviate from each other, thus rejecting the deviated one item of the lane-relevant candidate information.

6. The self-localization estimation device according to claim 3, wherein the set of computer-executable instructions further cause the processor to:

when there are items of the lane-relevant candidate information, and when at least one item of the lane-relevant candidate information deviates from the lane information, determine that the screening condition is satisfied for the at least one item of the lane-relevant candidate information, thus rejecting the deviated at least one item of the lane-relevant candidate information.

7. The self-localization estimation device according to claim 1, wherein the set of computer-executable instructions further cause the processor to notify a user that a confidence level of a result is low when plural items of the lane-relevant candidate information are present or when an amount of the error of the absolute localization is equal to or more than a predetermined margin.

* * * * *